United States Patent [19]
Nix

[11] Patent Number: 5,467,014
[45] Date of Patent: Nov. 14, 1995

[54] DEVICE FOR MEASURING THE THICKNESS OF A LAYER OR COATING ON A FERROUS AND/OR NON-FERROUS SUBSTRATE

[76] Inventor: Norbert Nix, Robert-Perthel-Strasse 2, 5000 Köln 60, Germany

[21] Appl. No.: 987,869

[22] Filed: Dec. 9, 1992

[30] Foreign Application Priority Data

Jul. 3, 1992 [EP] European Pat. Off. .............. 92111332

[51] Int. Cl.⁶ .............................. G01B 7/06; G01R 33/12
[52] U.S. Cl. ........................................ 324/230; 324/227
[58] Field of Search ..................... 324/229, 230, 324/231, 232, 227, 242–243, 239, 236, 240, 207.23

[56] References Cited

U.S. PATENT DOCUMENTS

| | | | |
|---|---|---|---|
| D. 335,463 | 5/1993 | Nix | D10/78 |
| 4,403,188 | 9/1983 | Nix | 324/230 |
| 4,539,847 | 9/1985 | Paap | 73/579 |
| 4,599,562 | 7/1986 | Koch | 324/230 |
| 4,715,007 | 12/1987 | Fujita et al. | 324/230 |
| 4,733,178 | 3/1988 | Koch | 324/230 |
| 4,745,809 | 5/1988 | Collins et al. | 324/226 |
| 4,904,939 | 2/1990 | Mian | 324/227 |
| 5,191,286 | 3/1993 | Fischer | 324/230 |
| 5,241,280 | 8/1993 | Aidun et al. | 324/230 |
| 5,343,146 | 8/1994 | Koch et al. | 324/227 |

FOREIGN PATENT DOCUMENTS

0460552A2 12/1991 European Pat. Off. .
2410047A1 9/1975 Germany .
3404720A1 8/1985 Germany .
WO88/01382 2/1988 WIPO .

OTHER PUBLICATIONS

"Schichtdickenmessung mit Magnetischen und Wirbelstrom-verfahren", Schubert, Werkstatt und Betrieb, vol. 112, No. 2, (Feb. 1979), pp. 123–127.

Multi-Check Brochure for coating thickness meter (prior art), List-Magnetik, Germany (date not available).

Positector Brochure, Automation Kohn, Company (Date not available).

*Primary Examiner*—Sandra L. O'Shea
*Assistant Examiner*—J. Patidar
*Attorney, Agent, or Firm*—Nikaido, Marmelstein, Murray & Oram

[57] ABSTRACT

A device for measuring the thickness of a layer of coating on a metal surface is disclosed. The device includes a housing, a first magnetic probe mounted on the housing for measuring the thickness of the layer on a metal substrate containing iron, and a second eddy current probe mounted on the housing for measuring the thickness of the layer on a metal substrate which does not contain iron. The first and second probes are physically separated from each other on the housing. A calculating circuit receives the output of one of the first and second probes and calculates the thickness of the layer as a function of the output of the one of the first and second probes. A display is coupled to the calculating circuit for displaying the thickness of the layer being measured.

10 Claims, 4 Drawing Sheets

5,467,014

DEVICE FOR MEASURING THE THICKNESS OF A LAYER OR COATING ON A FERROUS AND/OR NON-FERROUS SUBSTRATE

BACKGROUND OF THE INVENTION

1. Field of the Invention

The invention relates to a device for measuring the thickness of a layer or coating on a ferrous and/or nonferrous substrate comprising a first measuring probe for a metal substrate containing iron, a second measuring probe for a metal substrate not containing any iron, evaluating electronics and a housing.

2. Description of the Prior Art

In various industrial branches metals, for example steel sheets, are provided with coatings or layers, for example paint layers or additional metal layers, to protect the metal substrate from outer influences.

In particular, in the automobile industry steel sheets are processed onto which one or more paint layers have been applied. The thickness of the paint layers can be detected when required using a magnetic inductive measuring method.

Meanwhile, however, the automobile industry also processes nonferrous metals in combination with steel sheets. Accordingly, such materials are also coated. In the automobile industry for example moving parts of the bodywork, such as doors, trunk lid and engine hood, are made from light alloy or nonferrous metal whilst the loadbearing parts are made from steel sheet.

To measure the layer thicknesses of the coatings applied to said parts, for example paints or lacquers, the manufacturers, the paint shops, customers or assessors must use two different measuring devices, the measuring device for the nonferrous metals or light alloys being based on the eddy current principle whilst the measuring device for the steel sheets is based on said magnetic inductive measuring method. Working with two different devices is complicated and costly.

Combination measuring devices provided a remedy to a certain extent but they also have a great number of disadvantages.

A known combination measuring device consists of two devices and it is necessary to connect measuring probes operating by the two measuring principles referred to above with respective cables to evaluation electronics disposed in a housing. The devices have to be switched over and prepared for the particular use by complicated calibrating steps. The costs and practical handling of this known device are therefore likewise disadvantageous. Moreover, frequently confusion between the particular measuring probes necessary occurs and consequently erroneous measurements and erroneous coatings cannot be avoided.

Another known measuring device comprises a combination probe which is to measure firstly by the magnetic inductive method and secondly by the eddy current method. This combination probe is however not able to adequately satisfy the two necessary measuring methods. For the combination probe constructed to be extremely compact is disadvantageous in so far as the combination part intended for the magnetoinductive measurement influences the combination part intended for the eddy current method and consequently the measuring error increases considerably. Due to these erroneous measurements a corresponding measuring device was taken off the market again shortly after its introduction.

SUMMARY OF THE INVENTION

The present invention therefore has as its object the provision of a device for measuring the thickness of a layer on a metal substrate which does not have the disadvantages of the prior art; in particular, a measuring device is to be provided which firstly furnishes exact measured values both on metal substrates containing iron and on metal substrates not containing iron and secondly can be implemented in the form of an economic hand measuring device. The invention therefore proposes in a device for measuring the thickness of a layer on a metal substrate comprising a first measuring probe for a metal substrate containing iron, a second measuring probe for a metal substrate not containing any iron, evaluation electronics and a housing, the improvement in which the two measuring probes and the evaluation electronics are combined in the housing, the first measuring probe is constructed as separated magnetoinductive measuring probe and the second measuring probe is constructed as separate eddy current measuring probe.

Expedient embodiments will be apparent from the features defined in the subsidiary claims.

The advantages to be achieved with the device according to the present invention are due to the fact that the two measuring probes and the evaluation electronics are accommodated in a common housing in confined space, the first measuring probe being constructed specifically for the magnetoinductive measuring method whilst the second measuring probe is constructed specifically for the eddy current measuring method.

It is thereby ensured that firstly no separate measuring probes have to be exchanged or connected and secondly no combined method with inadequate measuring accuracy need be used; instead, optimized measuring probes which are specifically adapted to the respective measuring method and do not obstruct each other can be used.

The configuration in one housing in the form of a manual measuring device makes the apparatus easy to produce and use and also ensures that the device according to the invention is ready for use without modifications or complicated calibrations.

In the eddy current measuring method, the corresponding sensor induces in the metal substrate an alternating field through the coating of which the thickness is to be measured. The strength of said alternating field is proportional to the magnetic induction and the frequency thereof as well as the electrical conductivity of the material concerned. It depends additionally on the dimensions and thus also on the distance between the measuring sensor and the metal substrate so that in this manner the distance between the metal substrate and the measuring sensor and thus the thickness of the coating can be measured.

The magnetoinductive measuring method employs as a rule conventional inductance measuring bridges.

Advantageously, the measuring electronics of the device according to the invention are provided with an additional sensor in each case which is associated with one of the two measuring probes so that on placement of the device information is automatically made available to the electronics concerning which measuring probe is to be used and possibly which .evaluation of a measured value made available is to be carried out. This can also be effected simply in that on activation of the device according to the invention both measuring probes are initially briefly employed and by comparison of the two measured values the correct measured value is displayed either manually or automatically, the respective measuring probe being activated and the other measuring probe deactivated.

In this manner information on the desired use on a metal substrate containing iron or not containing iron can be automatically made available to the device according to the invention.

The measuring probes can for example be arranged at opposite sides of the housing. It is also possible to arrange the measuring probes at the same side of the housing laterally spaced apart but in this case the automatic activation of the desired sensor referred to above is difficult or even impossible to implement.

In this respect the arrangement of the two measuring probes on the housing at a predetermined angle to each other is necessary so that for example by tilting this embodiment of the measuring device according to the invention the particular measuring sensor desired can be placed on the surface to be measured.

Advantageously, the device according to the invention comprises an integrated display means, for example an LED or an LCD display, which should display at least the measured value and the measured unit. Said display could also provide the user with information on whether the measured value is obtained for a metal substrate containing iron or one not containing iron.

If the device according to the invention has respective probes on sides remote from each other, associated display means should also be provided on the respective sides of the measuring device directed away from each other. If the desired sensor is brought into contact with the layer or surface to be measured for example by tilting the device, one display means will suffice.

An additional screen may be provided between the two measuring sensors. Such a configuration is however as a rule necessary only when both measuring sensors are operated simultaneously and this is not usually the case.

The measuring electronics advantageously comprise output stages for the two sensors which are connected via a common analog/digital converter to a microprocessor or microcontroller. The common analog/digital converter will be connected to the respective output stage via an electronic switch depending upon the particular sensor operated.

The output stages advantageously furnish standardized output signals which are related to a standard zero point so that the measured values can be processed directly by the analog/digital converter and the microprocessor or microcontroller.

Of course, the output stages may also furnish non-standardized output signals and these however would then have to be supplied to an additional standardizing circuit, involving additional expenditure.

The display means associated with a measuring probe display the processed measured values directly in the form of layer thicknesses.

It is also possible to use separate analog/digital converters and separate microprocessors or microcontrollers for each measuring probe but increases the necessary expenditure.

The display via a single display means admittedly involves some loss of clearness but requires comparatively reduced expenditure.

BRIEF DESCRIPTION OF THE DRAWINGS

The present invention will be described in more detail hereinafter with the aid of the attached drawings. Further advantages and features will become apparent. In the drawings.

DESCRIPTION OF THE PREFERRED EMBODIMENTS

Figure 1:
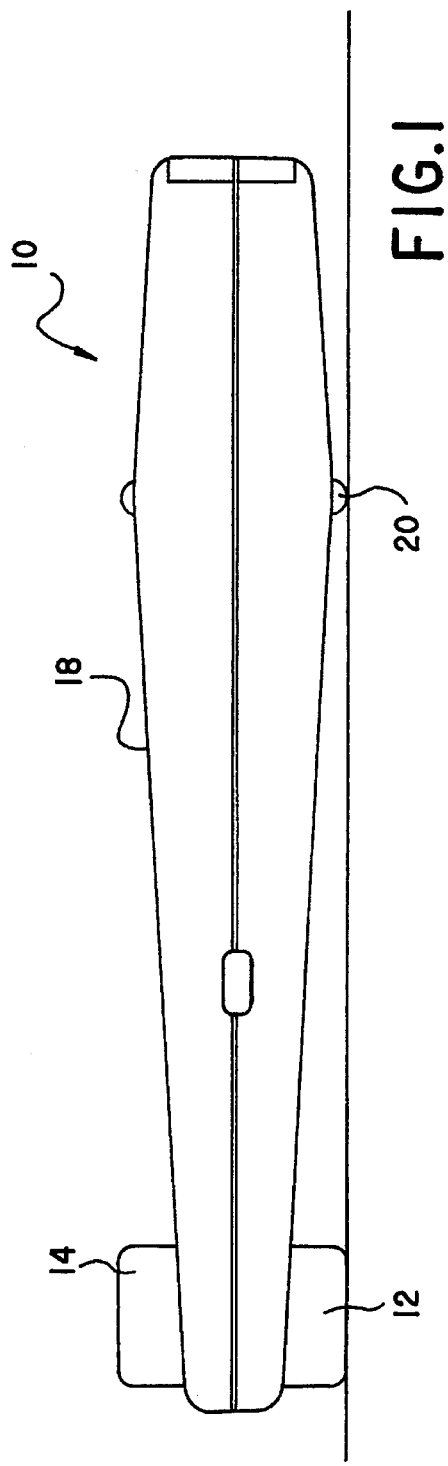
FIG. 1 shows a preferred embodiment of the device according to the invention in a side elevation.

The preferred embodiment of a measuring device 10 according to the invention shown in FIG. 1 comprises a housing 18, at the one end of which measuring probes 12, 14 are arranged at opposite sides of the housing 18. Support regions 20 represent auxiliary support points. In each case three support points are provided because three points always give a plane and consequently the device 10 according to the invention can be placed on almost any desired surface without being able to tilt. This avoids geometrically induced measuring errors.

Figure 2:
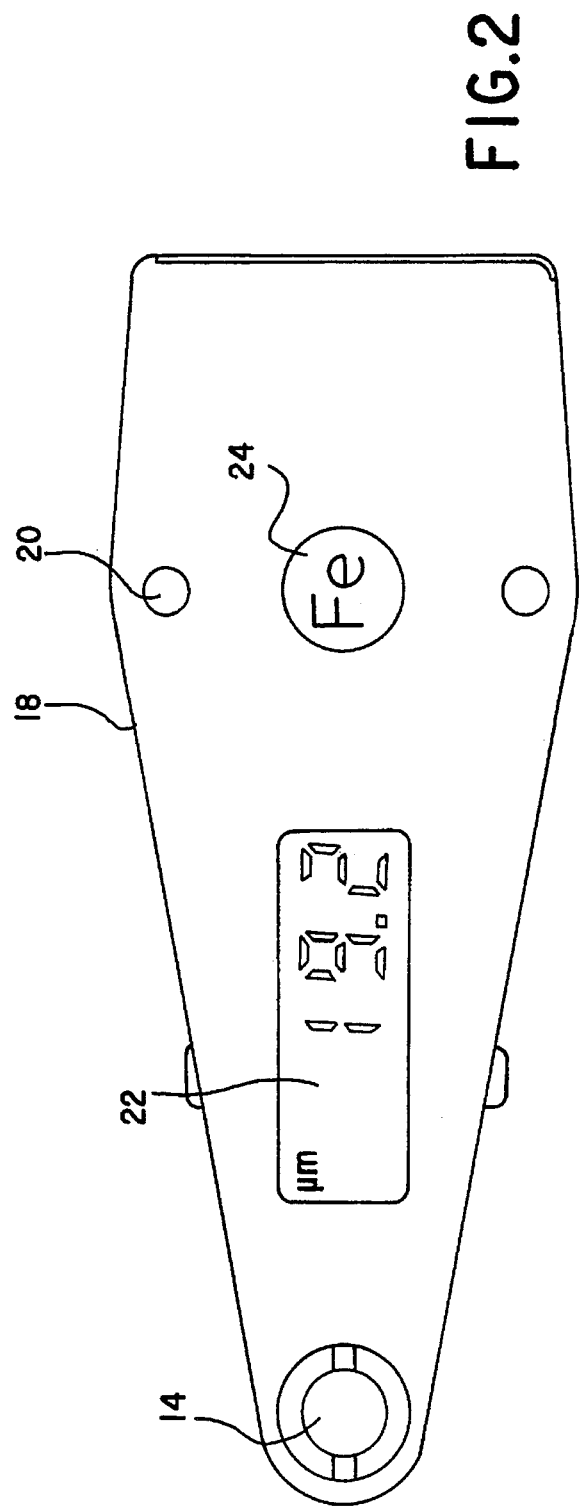
FIG. 2 shows the embodiment according to FIG. 1 in a plan view.

In FIG. 2 the embodiment according to FIG. 1 is shown in plan view, the probe 12 configured specifically for ferrous substrates being arranged on the side remote from said plan view as indicated by the marking 24 "Fe". The display 22 indicates tile value detected on the other side by the probe 12 and accordingly evaluated. The probe 14 shown is in contrast configured for metal substrates not containing iron and operates specifically by the eddy current measuring method. The support areas 20 are shown as studs with circular cross-section. The marking 24 indicates to the user that the probe 12 configured specifically for ferrous substrates is being used for the measurement and the result is displayed at 22.

Figure 3:
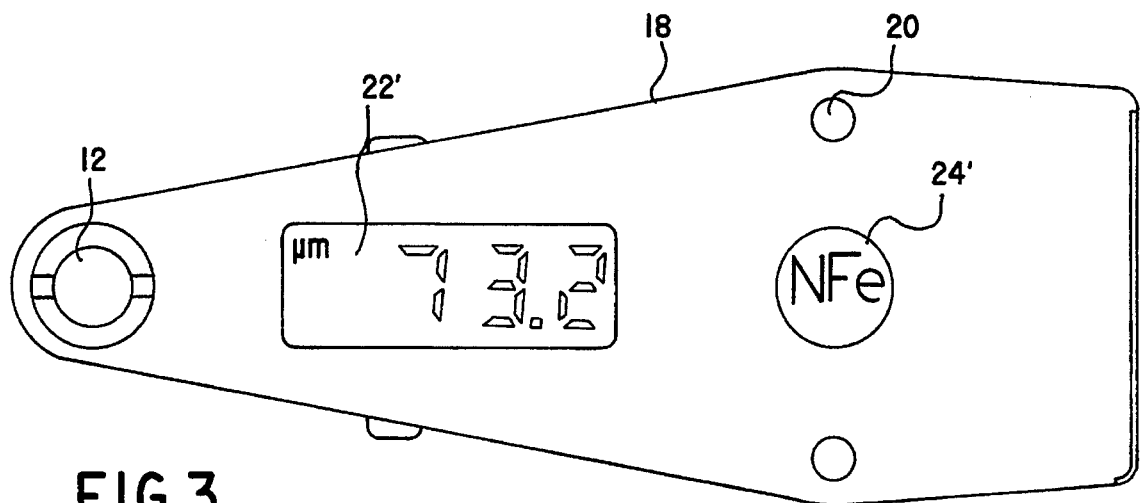
FIG. 3 shows the embodiment according to FIGS. 1 and 2 from the side opposite the illustration of FIG. 2.

FIG. 3 shows the other side of the device 10 with the probe 12. Here, a marking 24' "NFe" is disposed on the housing 18 and indicates that the probe 14 for measuring the coating thickness is resting for the measurement on a metal substrate not containing iron (NFe).

Figure 4:
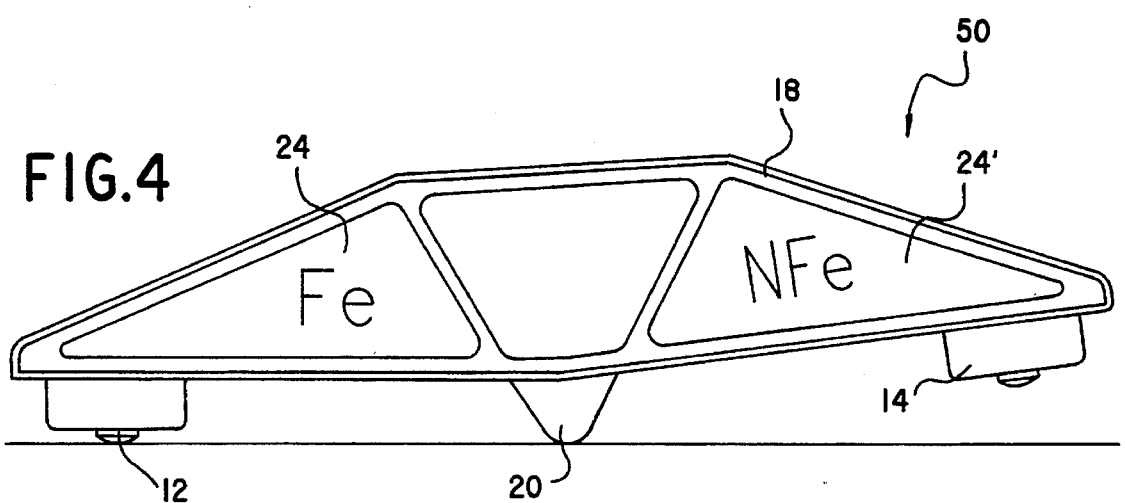
FIG. 4 shows a further embodiment of the present invention in a side elevation.
Figure 5:
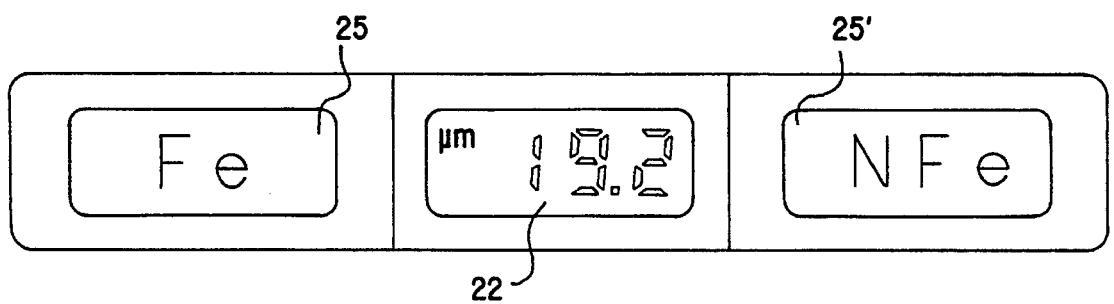
FIG. 5 shows the embodiment according to FIG. 4 in a plan view.
Figure 6:
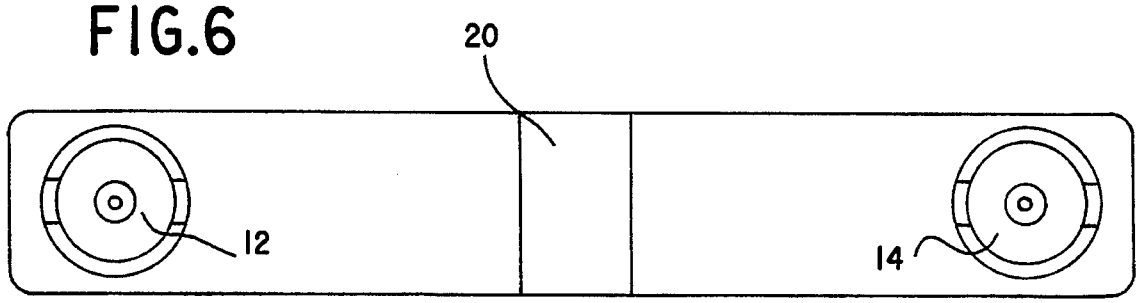
FIG. 6 shows the embodiment according to FIGS. 4 and 5 in a plan view from the side of the measuring probes.

FIGS. 4 to 6 show a further preferred embodiment of a measuring device 50 according to the present invention.

This device has two separate probes 12, 14 configured specifically for the respective measuring methods. To ensure the resting of the respective probe 12, 14 on the substrate, a support area 20 is arranged substantially in the center of the device so that the housing 18 in conjunction with the support area 20 and a respective sensor 12, 14 forms a rocker arm and the desired sensor 12 or 14 can be brought to bear on a surface to be measured by tilting about the support area 20. Indicating marks 24, 24' show the user which of the probes is configured for metal substrates containing iron (Fe), for example steel sheets, and which for metal substrates not containing iron (NFe), for example nonferrous metals or the like.

Indicating marks 25, 25' are also provided on the upper side of the measuring device 50 shown in FIG. 5 in order to show the user which particular sensor is being employed. The sole display 22 in this embodiment 50, for example an LED or LCD display, serves to show the measured values of both probes 12, 14.

From FIG. 6 the position of the probes 12, 14 with respect to the support area 20 is again apparent. The housing 18 has an elongated rectangular form so that it is easy to handle and transport. In this embodiment and the previous embodiment the respective probe is attached to the end of a flat and narrow tongue-like device body to enable measurements also a certain distance within hollow bodies, such as pipes, etc.

FIGS. 7 to 10 show a further embodiment 100 of a measuring device according to the present invention.

Figure 7:
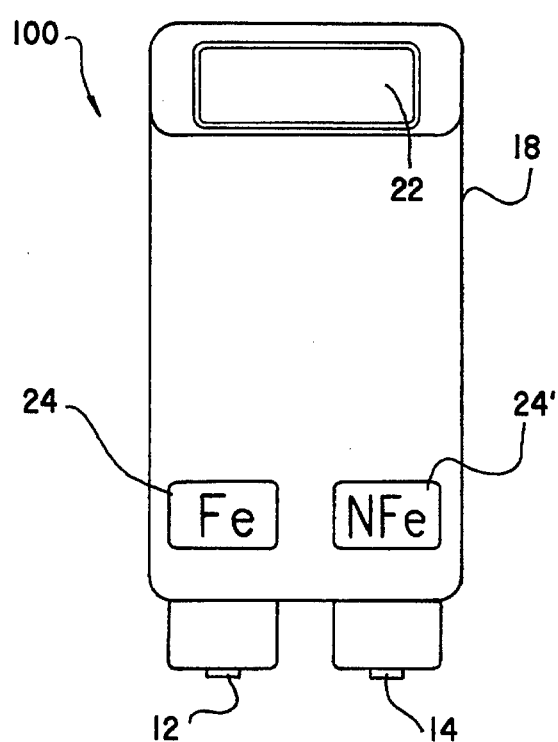
FIG. 7 shows a further embodiment of the present invention in a front view.

As apparent from FIG. 7, the probes 12, 14 are arranged at the lower end on the housing 18 according to the embodiment 100. In this embodiment in one variant both probes can come into contact with the surface to be measured so that it is left to the user to decide which of the two sensors is to be activated and connected to the evaluating electronics. For this purpose a switch (not illustrated) may be provided.

As an alternative to this, the measuring electronics automatically determines the nature of the substrate, i.e. Fe or NFe, selects the measuring procedure accordingly and displays the result.

Figure 8:
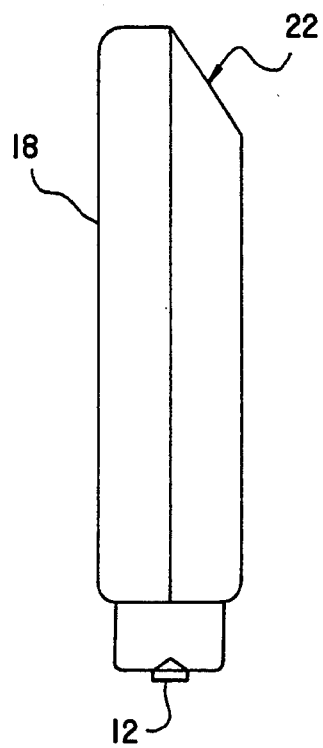
FIG. 8 shows the embodiment according to FIG. 7 in a side view.

As apparent from FIGS. 7 and 8 the display 22 is arranged inclined so that it is freely visible to the user even when the measuring device 100 is used at poorly accessible points, for example at greatly elevated points.

Figure 9:
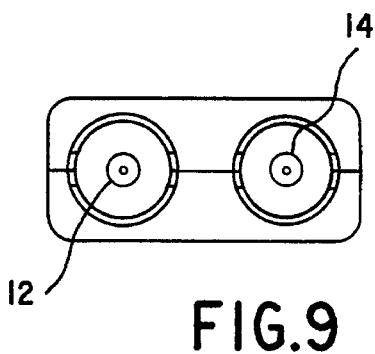
FIG. 9 shows the embodiment according to FIGS. 7 and 8 from the side of the measuring probes.
Figure 10:
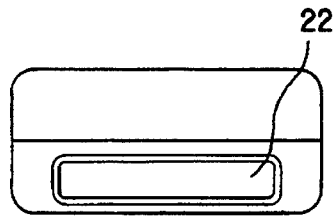
FIG. 10 shows the embodiment according to FIGS. 7, 8 and 9 in a plan view.

FIGS. 9 and 10 show the embodiment 100 respectively from an upper and a lower position to illustrate the location and accessibility of the display 22 and the location of the probes 12, 14.

Figure 11:
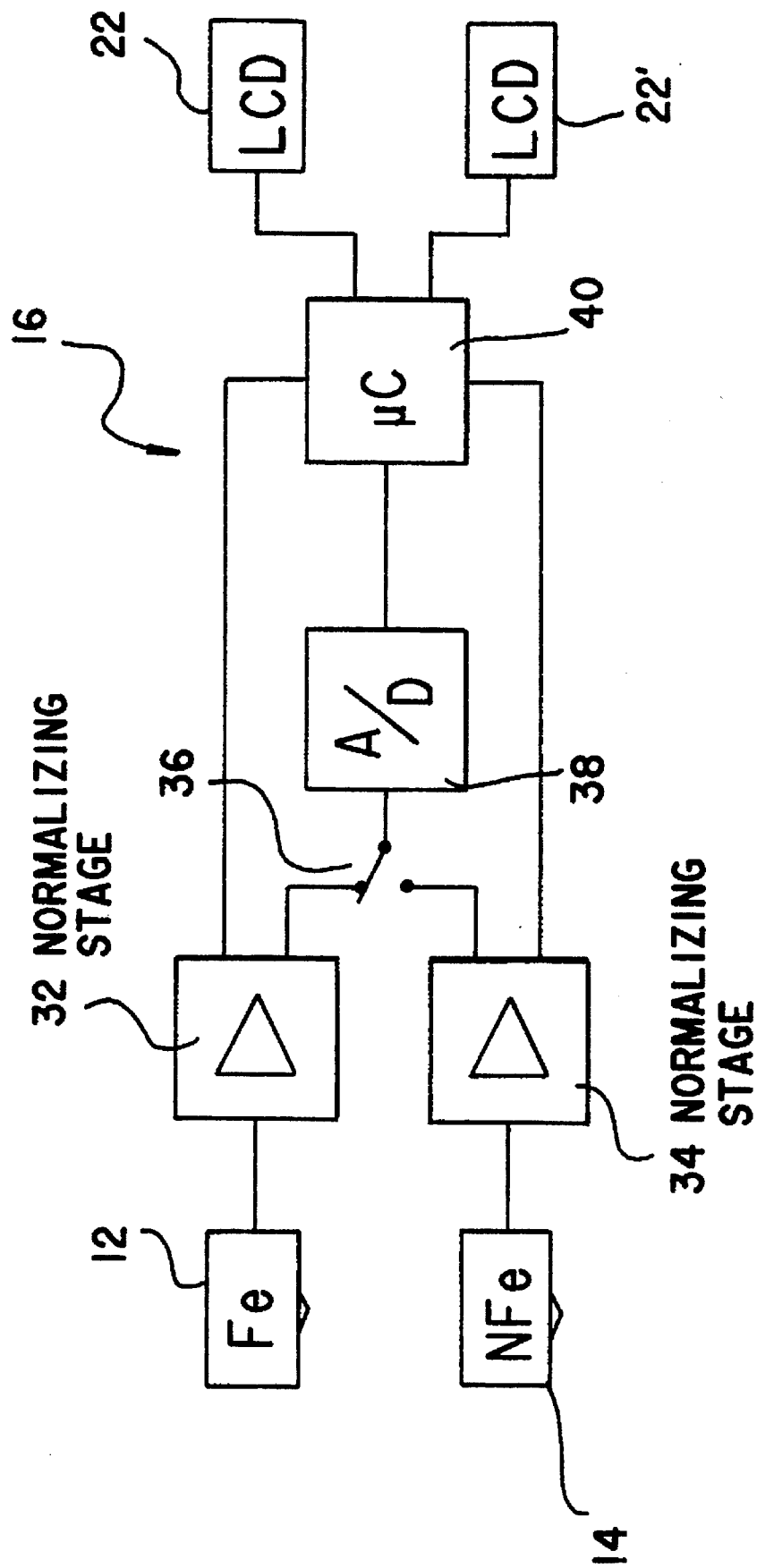
FIG. 11 shows a third embodiment of the sensor means or measuring electronics for a device according to the present invention.

FIG. 11 shows an example of evaluating electronics in conjunction with the probes 12, 14 and the respective LCD displays 22, 22'. The measurement signals originating from the probes 12, 14 constructed for their specific application are separately prepared, further processed and displayed.

The measurement signals of the probe 12, intended for example for steel sheets and based on the magnetoinductive method, is introduced into a normalizing stage 32 in which the measured signal is standardized or normalized. Applied to the one output of the stage 32 directly connected to a microcontroller or microprocessor 40 is an information signal which can for example provide the microcontroller with information on which of the two probes 12, 14 is to be connected via a switch 36 to the analog/digital converter 38. As mentioned, this switch 36 can be automatically switched without tile operator having to make any decision, or can be manually actuated. The decision can then also be made externally via the operator who can connect the particular probe to the analog/digital converter for example via a toggle switch or the like from the outside.

Of course, the automatic version is to be preferred because it avoids errors.

Thus, for example, at the start of a measuring operation both probes 12, 14 can be activated, the microcontroller 40 receiving a voltage pulse or the like only from the probe 12 or 14 of the associated normalizing stages 32, 34 brought into contact with a surface, and the probe which is not required can be disconnected, the switch 36 being actuated accordingly for that purpose. Depending on the position of the switch 36, the normalized output signal originating from the respective stage 32, 34 is passed to the analog/digital converter 38 which makes a digitized signal available to the microcontroller 40 for further evaluation. The microcontroller 40 can then show the finally calculated layer thickness on one of the displays 22, 22' or alternatively only on one display 22 as illustrated in FIGS. 3 and 7.

The connecting lines shown in FIG. 11 are only by way of example. Each of said connecting lines represents various measurement and/or control lines so that the microcontroller 40 can if necessary also intervene in the normalizing process in the stages 32, 34 in order to minimize any measurement errors. In particular, the microcontroller will detect and correct measurement errors due to temperature changes.

A particular advantage to be emphasized with all the embodiments 10, 50, 100 is that the respective probes 12, 14 provided are configured specifically for measurements on iron or steel, i.e. for measurements on metal substrates containing:iron, and for measurements on metal substrates not containing iron, for example nonferrous metals, i.e. aluminium or the like. Whilst the one probe is configured specifically for the eddy current method the other operates specifically by the magnetoinductive principle. The evaluating electronics can preferably operate automatically so that the user can hardly make any errors. The specialized probes 12, 14 accommodated in one easily portable and uncomplicated handy housing 18 do not interfere with each other. It is no longer necessary to modify the measuring devices 10, 50, 100, for example exchange probes 12, 14, change cables, switch from one measuring mode to another, recalibrate the device for the different probes 12, 14, etc. Erroneous measurements are practically eliminated.

I claim:

1. A device for measuring the thickness of a layer or coating on a metal substrate, said device comprising:
   (a) a housing;
   (b) a first magnetoinductive probe means mounted on said housing for measuring the thickness of the layer on a metal substrate containing iron;
   (c) a second eddy current probe means mounted on said housing for measuring the thickness of the layer on a metal substrate which does not contain iron;
   (d) wherein said first and second probe means are physically separated from each other on said housing; and
   (e) calculating circuit means for receiving the output of one of said first and second probe means and calculating the thickness of the layer as a function of the output of said one of said first and second probe means; and
   (f) display means coupled to said calculating circuit means, for displaying the thickness of the layer being measured.

2. A device according to claim 1, wherein said housing is dimensioned to be hand-held.

3. A device as set forth in claim 1, wherein said display means includes at least one display corresponding to each of said first and second probe means.

4. A device as set forth in claim 1, including normalizing circuit means coupled to the outputs of said first and second probe means, for normalizing the outputs thereof.

5. A device as set forth in claim 1, wherein said calculating circuit means includes at least one analog/digital converter.

6. A device as set forth in claim 1, wherein said calculating circuit means includes a microprocessor.

7. A device as set forth in claim 6, further including normalizing circuit means coupled to said first and second probe means and said microprocessor, said normalizing circuit means functioning with said microprocessor to normalize the output of said first and second probe means.

8. A device as set forth in claim 1, including a selector switch connected between said first and second probe means and said calculating circuit means for selectively connecting one of said first or second probe means to said calculating circuit means.

9. A device as set forth in claim 8, wherein said selector switch is coupled to and controlled by said microprocessor.

10. A device as set forth in claim 8, wherein said selector switch is a manually operated switch.

* * * * *